United States Patent
Greaves (10) Patent No.: US 9,157,532 B2
(45) Date of Patent: Oct. 13, 2015

(54) HYDRAULIC SEAL ARRANGEMENT

(71) Applicant: ROLLS-ROYCE PLC, London (GB)

(72) Inventor: Richard Greaves, Derby (GB)

(73) Assignee: ROLLS-ROYCE plc, London (GB)

( * ) Notice: Subject to any disclaimer, the term of this patent is extended or adjusted under 35 U.S.C. 154(b) by 97 days.

(21) Appl. No.: 14/080,438

(22) Filed: Nov. 14, 2013

(65) Prior Publication Data

US 2014/0158232 A1 Jun. 12, 2014

(30) Foreign Application Priority Data

Dec. 6, 2012 (GB) .................................. 1221957.2

(51) Int. Cl.
*F16J 15/42* (2006.01)
*F01D 11/04* (2006.01)
*F16J 15/40* (2006.01)

(52) U.S. Cl.
CPC .................. *F16J 15/42* (2013.01); *F01D 11/04* (2013.01); *F16J 15/40* (2013.01); *F16J 15/406* (2013.01); *Y10T 137/8593* (2015.04)

(58) Field of Classification Search
CPC ........... F16J 15/40; F16J 15/406; F16J 15/42; F16J 15/447; F16J 15/4472; F01D 11/02; F01D 11/04; F01D 11/06; F04D 29/106; F04D 29/108
See application file for complete search history.

(56) References Cited

U.S. PATENT DOCUMENTS

| | | | | |
|---|---|---|---|---|
| 822,802 A * | 6/1906 | Wilkinson | ..................... | 277/427 |
| 876,613 A * | 1/1908 | Wilkinson | ..................... | 277/427 |
| 1,749,586 A * | 3/1930 | Johnson | ..................... | 277/412 |
| 2,133,879 A * | 10/1938 | Thearle | ..................... | 277/428 |
| 2,573,425 A * | 10/1951 | Fletcher, Jr. | ..................... | 277/424 |
| 2,823,052 A * | 2/1958 | Collman | ..................... | 277/428 |
| 4,335,885 A * | 6/1982 | Heshmat | ..................... | 277/347 |
| 4,527,802 A * | 7/1985 | Wilcock et al. | ..................... | 277/302 |
| 4,570,947 A * | 2/1986 | Smith | ..................... | 277/428 |
| 4,671,677 A * | 6/1987 | Heshmat et al. | ..................... | 384/124 |
| 6,164,658 A * | 12/2000 | Collin | ..................... | 277/418 |
| 6,568,688 B1 * | 5/2003 | Boeck | ..................... | 277/411 |
| 6,921,079 B2 * | 7/2005 | Rensch | ..................... | 277/428 |
| 7,159,873 B2 * | 1/2007 | McCutchan | ..................... | 277/427 |
| 2009/0189356 A1 * | 7/2009 | Gaebler et al. | ..................... | 277/431 |
| 2010/0090415 A1 * | 4/2010 | Scothern et al. | ..................... | 277/431 |

FOREIGN PATENT DOCUMENTS

| | | | |
|---|---|---|---|
| CA | 1 173 872 A | 9/1984 |
| DE | 195490 C | 11/1906 |

(Continued)

OTHER PUBLICATIONS

Search Report issued in European Application No. 13192821 dated Mar. 31, 2014.

(Continued)

Primary Examiner — Kristina Fulton
Assistant Examiner — Nicholas L Foster
(74) Attorney, Agent, or Firm — Oliff PLC (57) ABSTRACT

A hydraulic seal arrangement for a rotating machine, the hydraulic seal arrangement comprising: a hydraulic seal; and an annular reservoir (16) fluidly coupled to the hydraulic seal; wherein the annular reservoir (16) is arranged to retain fluid from the hydraulic seal when the machine is shutdown and to return the retained fluid to the hydraulic seal under centrifugal force after the machine is restarted.

13 Claims, 5 Drawing Sheets

(56) References Cited

FOREIGN PATENT DOCUMENTS

| DE | 10 2005 047 696 A1 | 3/2007 |
|---|---|---|
| EP | 0 561 014 A1 | 9/1993 |
| EP | 2 177 795 A1 | 4/2010 |
| GB | 1 212 593 | 11/1970 |
| JP | A-62-261765 | 11/1987 |
| JP | A-2003-148632 | 5/2003 |

OTHER PUBLICATIONS

Search Report issued in British Patent Application No. GB1221957.2 dated Apr. 10, 2013.

* cited by examiner

HYDRAULIC SEAL ARRANGEMENT

The present invention relates to a hydraulic seal arrangement for a rotating machine and particularly but not exclusively to an intershaft hydraulic seal in a gas turbine engine.

BACKGROUND

Hydraulic seals are used, particularly in the aerospace industry, to prevent air from traversing the seal. Particularly, hydraulic seals are used to form a seal between two relatively rotating components. For example, a hydraulic seal may be used to seal an intershaft cavity between concentric co-rotating or counter-rotating shafts of a gas turbine engine.

Figure 1:
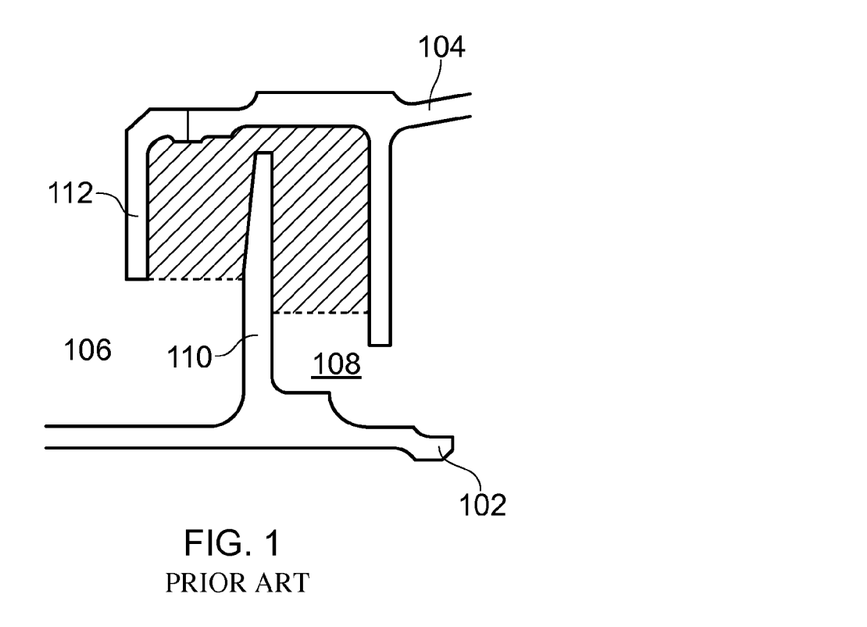
FIG. 1 is a sectional view of a prior art hydraulic seal at top dead centre and in an axial direction.

FIG. 1 is a sectional view at top dead centre of a known intershaft hydraulic seal. The hydraulic seal is used to seal between concentrically arranged inner and outer shafts 102, 104 of a multi-spool engine.

The inner and outer shafts 102, 104 rotate at different speeds about a common axis and the hydraulic seal is used to seal a relatively high pressure region 106 from a relatively low pressure region 108.

The inner shaft 102 comprises an annular seal member or fin 110 which projects radially outward from the inner shaft 102 and extends around the entire circumference of the inner shaft 102.

The outer shaft 104 comprises an annular trough 112 which faces radially inward and extends around the entire circumference of the outer shaft 104.

The fin 110 of the inner shaft 102 is received within the trough 112 of the outer shaft 104.

The trough 112 is fed with hydraulic fluid (e.g. oil). The rotation of the outer shaft 104 creates sufficient centrifugal force to retain the hydraulic fluid within the trough 112. Accordingly, an annulus of fluid is formed in the trough 112.

The fin 110 is partially submerged in the annulus of fluid held by the trough 112. Consequently, a seal is formed and the difference in air pressure between the high pressure region 106 and the low pressure region 108 is compensated for by a difference in the fluid level on either side of the fin 110 (akin to a U-tube manometer).

In order for a seal to form, the outer shaft 104 must rotate at sufficient speed to create the annulus of fluid. Furthermore, a continuous feed of hydraulic fluid is required to fill the entire circumference of the trough 112 and to provide a circulation of fluid through the seal.

The sealing capability of an intershaft hydraulic seal at the point of seal formation is determined by the quantity of fluid within the hydraulic seal. The quantity of fluid within the seal is determined by a combination of the initial fluid feed and the retained volume of fluid within the hydraulic seal on shutdown (i.e. when all components have ceased rotation), around bottom dead centre.

Any direct fluid feed to the hydraulic seal from a pump can incur a delay, inherent in the complexity of the system. Therefore in isolation, the retained fluid volume can offer insufficient sealing capability during initial operation.

European Patent Application Number 09252342.2 discloses a hydraulic seal arrangement which is designed to ensure that sufficient fluid is retained within the seal on shutdown. The arrangement comprises an annular trough having a pair of seal exit weirs which allow excess fluid to exit the trough for scavenging. On passing over the seal exit weirs, the excess fluid enters an annular trap. The trap is provided with a pair of trap exit weirs which allow excess fluid to flow out of the trap.

On shutdown, and in the absence of centrifugal effects, the hydraulic fluid collects at the bottom of the trough. Accordingly, when the body of fluid passes one of the seal exit weirs, fluid will flow out of the trough and into the trap, and will do so until the fluid levels are equal on both sides of the seal exit weir.

Pockets are provided in the vicinity of the trap exit weirs to reduce the fluid level and to prevent the fluid from exiting the trap via the trap exit weirs. If the pockets were not provided, the trap would spill a small volume of fluid each time the trap exit weir approached bottom dead centre, which would be refilled from the trough as the seal exit weir approached bottom dead centre. Consequently, the trough could slowly drain until it retained insufficient oil to form an adequate seal.

Although this arrangement acts to maintain a minimum amount of hydraulic fluid in the trough, the actual volume of hydraulic fluid retained is limited by the geometry of the hydraulic seal. Consequently, there may be applications where this arrangement is unable to retain sufficient fluid.

Accordingly, the present invention seeks to provide a hydraulic seal arrangement which retains hydraulic fluid on shutdown in order to rapidly form a seal when operation recommences, and where the volume of retained fluid is independent of the geometry of the hydraulic seal.

BRIEF SUMMARY OF INVENTION

In accordance with an aspect of the invention there is provided a hydraulic seal arrangement for a rotating machine, the hydraulic seal arrangement comprising: a hydraulic seal; and an annular reservoir fluidly coupled to the hydraulic seal; wherein the annular reservoir is arranged to retain fluid (e.g. oil) from the hydraulic seal when the machine is shutdown and to return the retained fluid to the hydraulic seal under centrifugal force after the machine is restarted.

As the fluid is stored in an external reservoir instead of within the hydraulic seal itself, the quantity of retained fluid is independent of the geometry of the hydraulic seal. The reservoir may be configured to retain sufficient fluid in order to form a seal when the machine is restarted without requiring any additional fluid feed. Furthermore, storing the fluid within the reservoir may preserve the fluid and avoid degradation.

The present invention may allow a seal to form without receiving any additional hydraulic fluid from a dedicated feed. The invention may therefore reduce the time required for a seal to form and reach its maximum sealing capability for a given rotational speed. Furthermore, the invention may mitigate the risks associated with insufficient retained fluid volume and/or delayed fluid feed which may be experienced in a conventional intershaft hydraulic seal design. In addition, the annular reservoir and hydraulic seal arrangement is well suited to the space envelope (the geometric space in which the design should fit) associated with hydraulic seal applications.

The annular reservoir may comprise one or more openings which allow fluid to enter the reservoir during normal operation and/or to exit the reservoir after the machine is restarted. The fluid may enter and exit the reservoir through the same or different openings.

The annular reservoir may comprise a valve which selectively closes the opening.

The valve may selectively close the opening in response to the rotational speed of the machine.

The valve may be maintained in an open position under normal operating conditions to allow fluid to flow into and/or through the reservoir. The valve may be closed when the speed of rotation falls below a predetermined threshold in order to retain the fluid within the reservoir. When the speed of rotation exceeds the predetermined threshold the valve returns to the open position to allow the fluid to return to the hydraulic seal.

This may be particularly useful where the machine is bi-directional (i.e. it rotates both clockwise and anticlockwise).

The annular reservoir may comprise an inner chamber having an opening, an outer chamber having an opening and a central chamber in fluid communication with the inner and outer chambers.

The annular reservoir may be arranged such that under normal operation fluid enters the annular reservoir via the opening of the outer chamber and exits the annular reservoir via the opening of the inner chamber.

The annular reservoir may be arranged such that upon shutdown of the machine the inner and outer chambers of the annular reservoir are drained of fluid and the central chamber retains fluid.

The retained fluid may be returned to the hydraulic seal after the machine is restarted via the opening of the outer chamber.

The outer chamber may be positioned further radially outward than at least a portion of the central chamber and the inner chamber may be positioned further radially inward than at least a portion of the central chamber.

The volume of the central chamber may be maximised by overlapping a portion of the central chamber with the inner chamber and outer chamber. Accordingly, the inner and outer chambers may have a smaller axial width than the central chamber to allow this. Furthermore, this arrangement may allow the fluid to flow more easily from the central chamber to the outer chamber after the machine is restarted.

The inner, outer and central chambers may be separated by partitions.

The partitions may extend around only a portion of the circumference of the annular reservoir and terminate in a transition region where fluid may traverse between chambers.

One end of the inner and outer chambers may be sealed from the transition region by a dividing wall. The dividing wall may be adjacent the openings of the inner and outer chambers and may separate the openings from the transition region.

The inner and outer chambers may be spaced from one another in an axial direction.

The opening of the outer chamber may be oriented in a substantially axial direction and/or the opening of the inner chamber may be oriented in a substantially radial direction.

The openings of the inner and outer chambers may be radially aligned.

The hydraulic seal may comprise: an outer member having an annular fluid retaining trough; and an inner member having an annular sealing member, the sealing member being received in the trough.

The annular reservoir may be disposed on the inner or outer member.

The hydraulic seal arrangement may be used in a gas turbine engine to seal, for example, an intershaft cavity.

Although the annular reservoir has been described with reference to an intershaft hydraulic seal, it could be used in any application where a component or system may suffer from fluid starvation or a delay in fluid feed and thus it is desired to provide an immediate hydraulic fluid feed. For example, the annular reservoir may be used with: hydraulic traps, splines, bearings, gears, pumps, jets, etc.

BRIEF DESCRIPTION OF THE DRAWINGS

For a better understanding of the present disclosure, and to show more clearly how it may be carried into effect, reference will now be made, by way of example, to the accompanying drawings, in which:—

DETAILED DESCRIPTION

Figure 2:
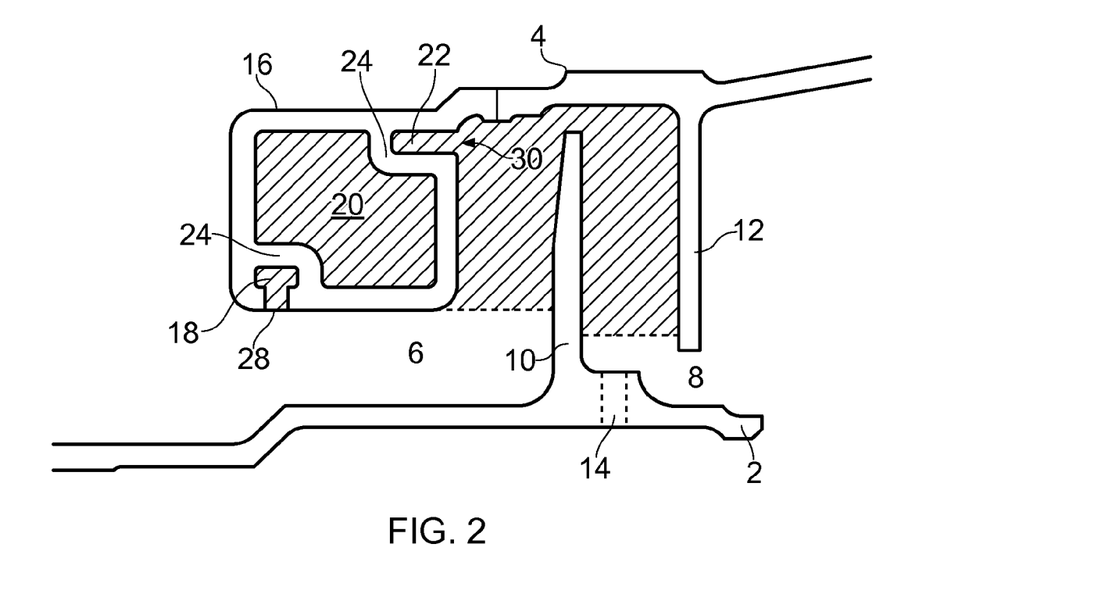
FIG. 2 is a sectional view of a hydraulic seal according to an embodiment of the invention at top dead centre and in an axial direction.

With reference to FIG. 2, a hydraulic seal arrangement according to an embodiment of the invention is shown. The hydraulic seal arrangement comprises a hydraulic seal which may be used, for example, to seal between concentrically arranged inner and outer shafts 2, 4 of a multi-spool engine.

The inner and outer shafts 2, 4 rotate at different speeds about a common axis and the hydraulic seal is used to seal a relatively high pressure region 6 from a relatively low pressure region 8.

The inner shaft 2 comprises an annular seal member or fin 10 which projects radially outward from the inner shaft 2 and extends around the entire circumference of the inner shaft 2.

The outer shaft 4 comprises an annular trough 12 which faces radially inward and extends around the entire circumference of the outer shaft 4.

The fin 10 of the inner shaft 2 is received within the trough 12 of the outer shaft 4.

The inner shaft 2 further comprises an inlet port 14. In use, the inlet port 14 supplies hydraulic fluid (e.g. oil) in a radial direction to the side of trough 12 adjacent the low pressure region 8.

The outer shaft 4 further comprises an annular reservoir 16. The annular reservoir 16 is arranged to retain fluid from the hydraulic seal when the engine is shutdown and to return the retained fluid to the hydraulic seal under centrifugal force after the engine is restarted.

Figure 3:
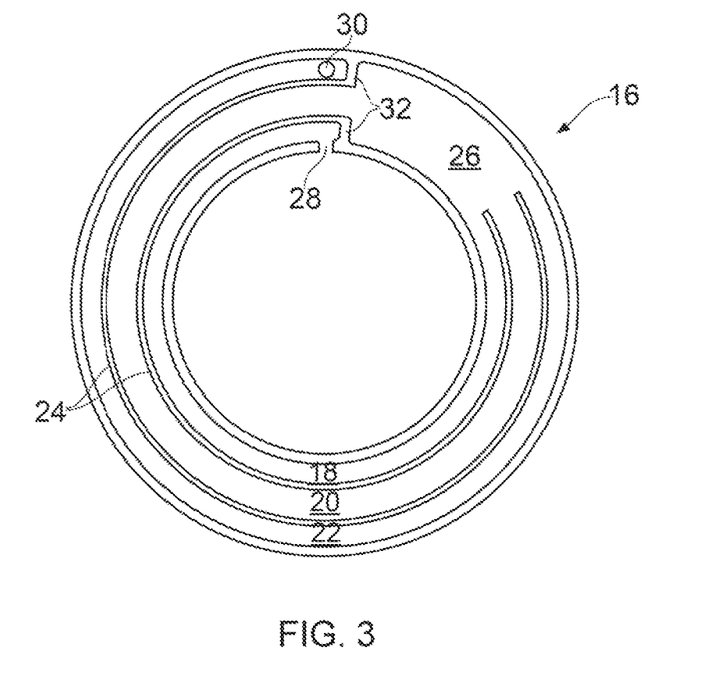
FIG. 3 is a sectional view of the reservoir in a radial direction.

As shown in FIGS. 2 and 3, the annular reservoir 16 is divided into an inner chamber 18, a central chamber 20 and an outer chamber 22. The inner chamber 18 is separated from the central chamber 20 by a circumferential partition wall 24. Similarly, the outer chamber 22 is separated from the central chamber 20 by a circumferential partition wall 24.

The partition walls 24 extend around the majority of the circumference of the annular reservoir 16. However, the partition walls 24 are not continuous and terminate to form a transition region 26. In the transition region 26, the annular reservoir 16 is undivided and thus fluid may traverse between the inner, central and outer chambers 18, 20, 22. The transition region 26 therefore provides fluid communication between the chambers.

The inner chamber 18 is provided with an opening 28 which is oriented in a substantially radial direction. The outer chamber 22 is provided with an opening 30 which is oriented in a substantially axial direction. The openings 28, 30 are disposed at substantially the same circumferential position about the annular reservoir 16.

The openings 28, 30 of the inner and outer chambers 18, 22 are each separated from the transition region 26 by a substantially radial dividing wall 32.

Figure 4:
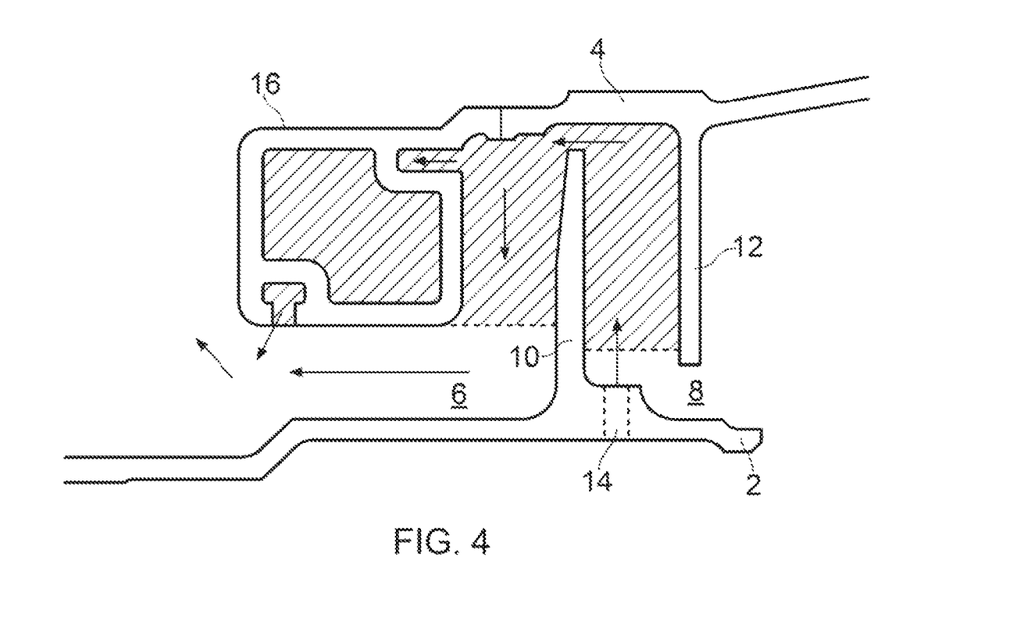
FIG. 4 is a sectional view of the hydraulic seal at top dead centre and in an axial direction showing the flow of fluid through the seal under normal operating conditions.

As indicated in FIG. 4, under normal operating conditions, hydraulic fluid (e.g. oil) is fed to the trough 12 from the inlet port 14. The rotation of the outer shaft 4 creates sufficient centrifugal force to retain the hydraulic fluid within the trough 12. Accordingly, an annulus of hydraulic fluid is formed in the trough 12.

The fin 10 is partially submerged in the annulus of hydraulic fluid held by the trough 12. Consequently, a seal is formed and the difference in air pressure between the high pressure region 6 and the low pressure region 8 is compensated for by a difference in the fluid level on either side of the fin 10 (akin to a U-tube manometer).

The supply of hydraulic fluid from the inlet port 14 causes the fluid to flow through the trough 12. A portion of the hydraulic fluid flows into the annular reservoir 16 via the opening 30 of the outer chamber 22. The hydraulic fluid flows through the annular reservoir 16 before exiting through the opening 28 of the inner chamber 18.

The hydraulic fluid which has passed through the hydraulic seal either directly or via the annular reservoir 16 is recovered by a scavenge pump and is reused. This continuous flow of hydraulic fluid prevents overheating and coking.

Figure 5:
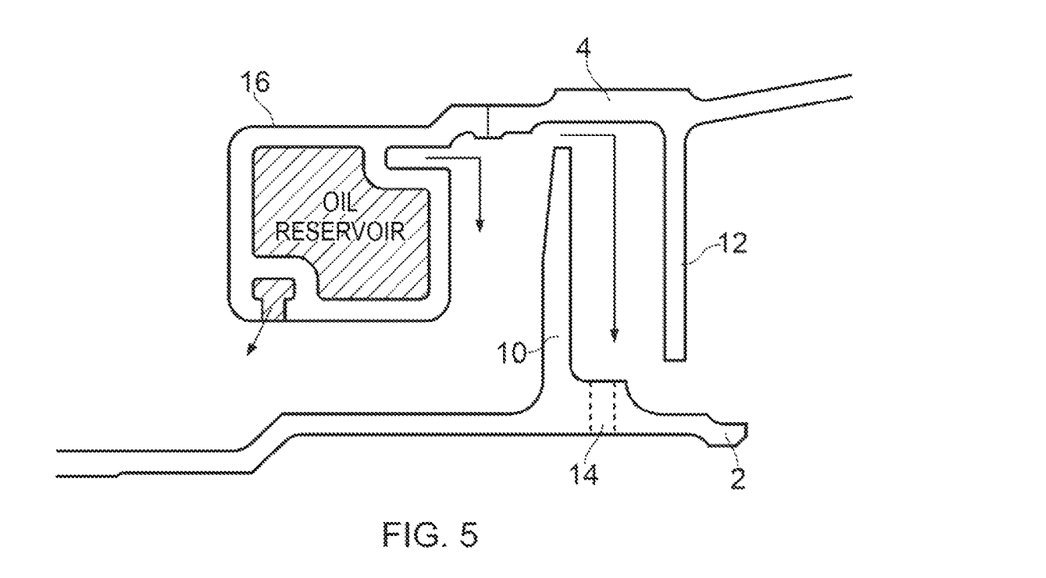
FIG. 5 is a sectional view of the hydraulic seal at top dead centre and in an axial direction showing the flow of fluid at a reduced rotational speed.

In order for a seal to form, the outer shaft 4 must rotate at sufficient speed to create the annulus of hydraulic fluid. When the speed of rotation is reduced such that there is insufficient centrifugal force, the hydraulic fluid will fall towards the centre of the engine, as shown in FIG. 5. The collapse of the annulus of hydraulic fluid results in the loss of sealing between the high pressure region 6 and the low pressure region 8.

Figure 6:
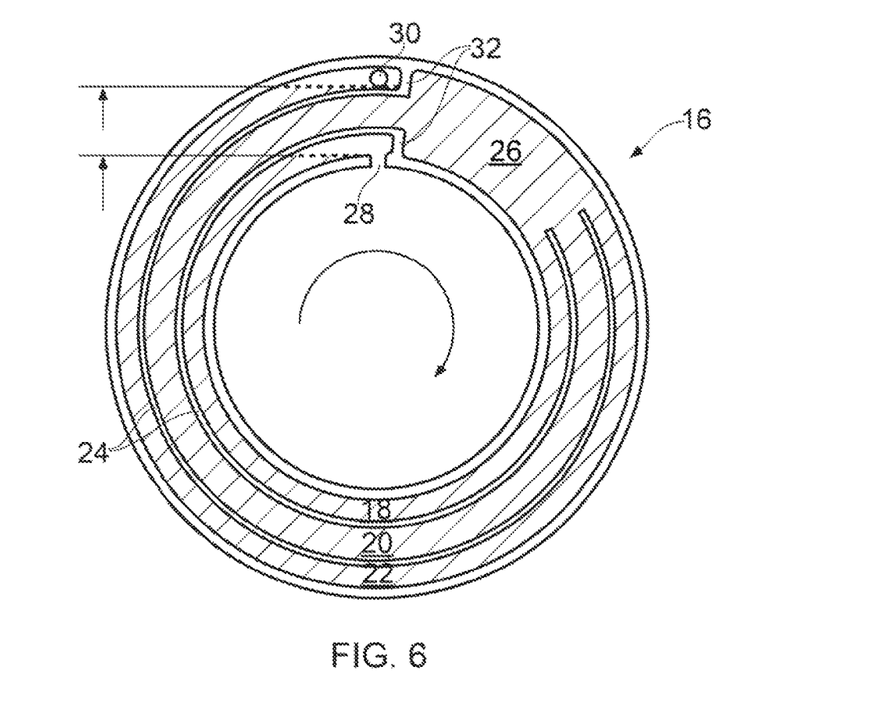
FIGS. 6 to 9 are sectional views of the reservoir in a radial direction illustrating the drainage of fluid from the seal at reduced rotational speed.
Figure 7:
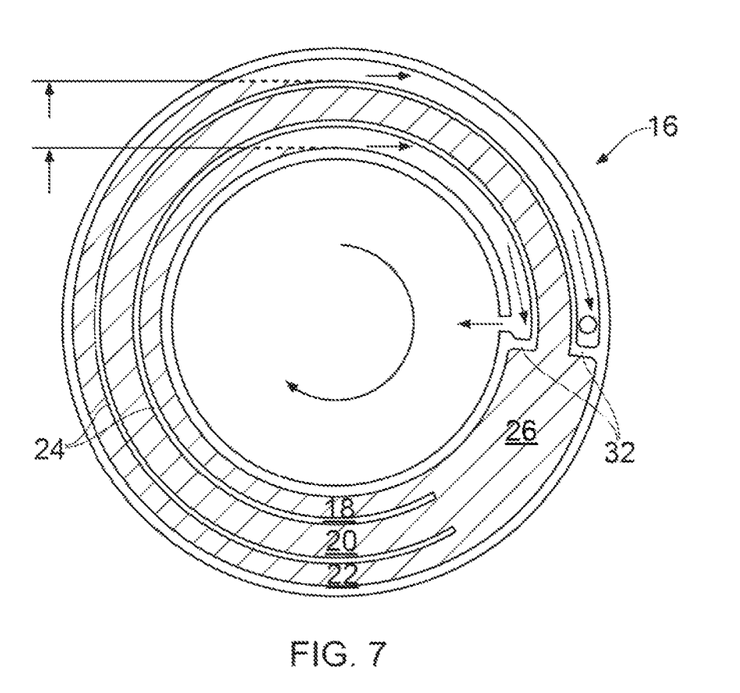

At low rotational speed (i.e. where the annulus of hydraulic fluid has collapsed due to insufficient centrifugal force), hydraulic fluid is allowed to drain out of the inner and outer chambers 18, 22 under gravity, as depicted in FIGS. 6 and 7.

Figure 8:
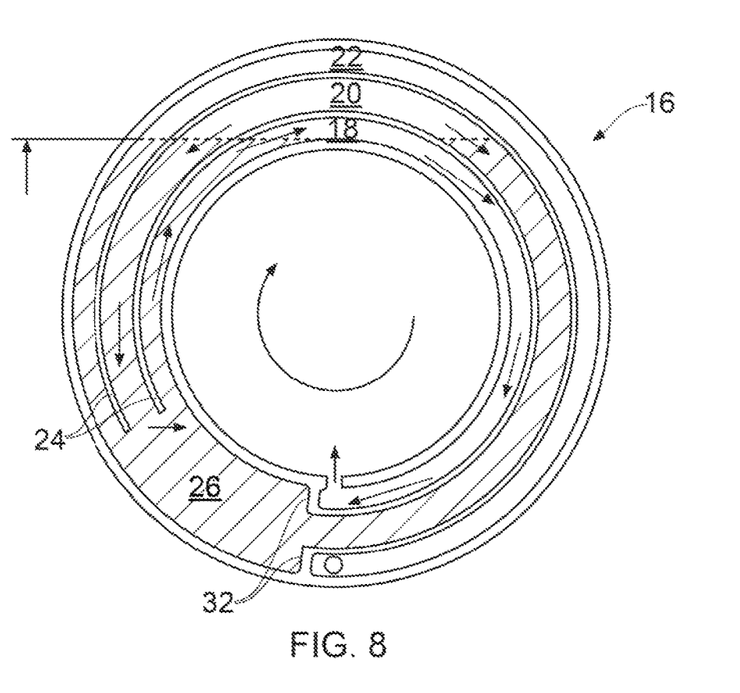

As shown in FIG. 8, a portion of the hydraulic fluid contained in the central chamber 20 is also allowed to drain out of the annular reservoir 16 via the transition region 26 and the inner chamber 18.

Figure 9:
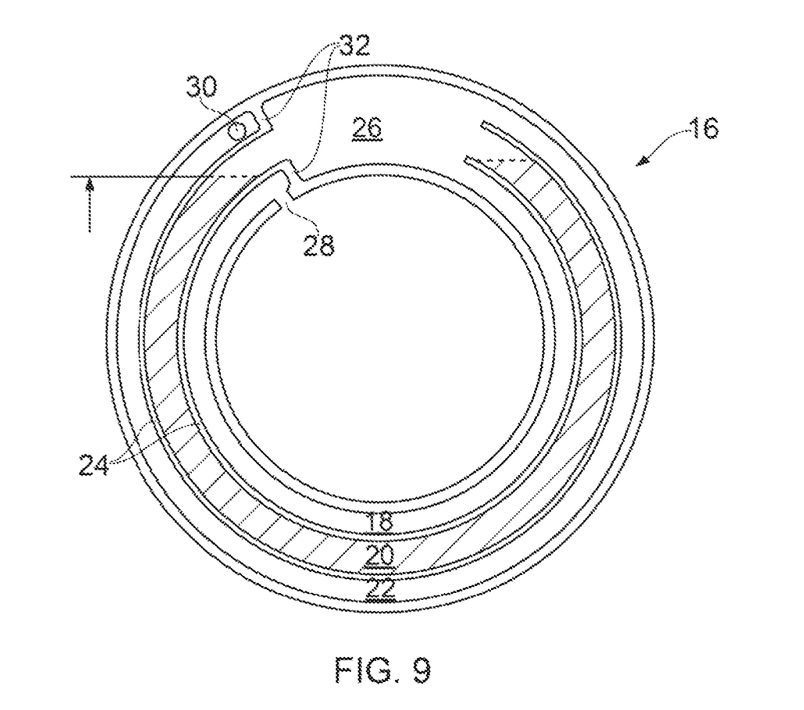

When the hydraulic fluid in the central chamber 20 reaches a certain level (see FIG. 9), further rotation of the outer shaft 4 does not cause any additional fluid to drain from the annular reservoir 16. At this level, rotation of the outer shaft 4 causes the fluid to flow out of the central chamber 20 on the side spaced from the dividing walls 32 and into the inner chamber 18 via the transition region 26. As the rotation of the outer shaft 4 continues, the hydraulic fluid will flow back into the transition region 26 from the inner chamber 18. Here the hydraulic fluid is channeled back into the other side of the central chamber 20 by the dividing walls 32.

The quantity of retained hydraulic fluid is determined by the geometry of the annular reservoir 16 and its chambers and thus is independent of the hydraulic seal itself. The final retained volume of hydraulic fluid is therefore not dependent on the time taken nor the rate with which the annular reservoir 16 comes to a stationary position. Furthermore, it is also independent of the final angular orientation of the annular reservoir 16.

Figure 10:
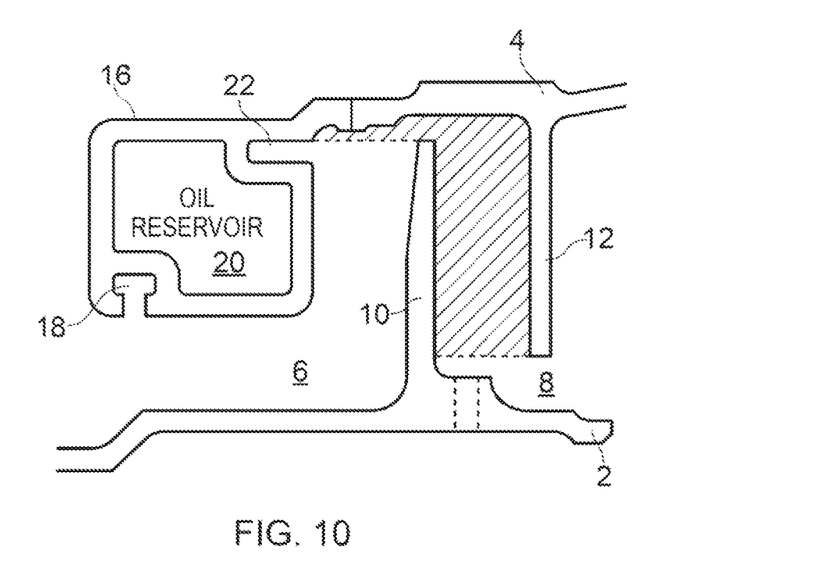
FIG. 10 is a sectional view of the hydraulic seal at top dead centre and in an axial direction showing the flow of fluid when normal operating conditions recommence.

When the engine is restarted and the outer shaft 4 is rotating at sufficient speed, the centrifugal force generated will force the hydraulic fluid to the outside of the transition region 26 and into the outer chamber 22 where it can exit the annular reservoir 16 through the opening 30. The hydraulic fluid is redistributed within the trough 12 to form the seal. Any subsequent pressure difference across the seal will displace the hydraulic fluid to provide a sealing capability.

The seal is thus able to form without receiving any additional hydraulic fluid from the inlet port 14. In contrast, conventional intershaft hydraulic seal designs require a dedicated hydraulic fluid feed in order to reach maximum sealing capability. This may compromise sealing capability at low speed until sufficient fluid is provided to the hydraulic seal.

The present invention therefore mitigates risk associated with insufficient retained fluid volume and/or delayed fluid feed which may be evident in a conventional intershaft hydraulic seal design. The annular reservoir and hydraulic seal arrangement is well suited to the space envelope associated with hydraulic seal applications.

Although the seal is able to form without any additional hydraulic fluid, the inlet port 14 may subsequently provide additional hydraulic fluid to the hydraulic seal in order to refill the annular reservoir 16 and to return to normal operation as depicted in FIG. 4.

In this embodiment, the retained hydraulic fluid is sufficient to completely fill the hydraulic seal. However, the geometry of the annular reservoir 16 can be defined to retain anything from 0-100% of the oil required to fill the hydraulic seal.

In another embodiment (not shown), the annular reservoir may comprise a valve or piston ring arrangement which allows fluid to flow into and/or out of the reservoir under certain conditions.

In particular, the annular reservoir may comprise a valve which selectively closes an opening in the annular reservoir in response to the rotational speed of the machine. For example, when the speed of the machine is above a predetermined threshold (as experienced under normal operating conditions) the valve may be maintained in an open position to allow fluid to flow into and/or through the annular reservoir. The valve may then close when the speed of rotation falls below the predetermined threshold in order to retain the fluid within the reservoir. When the speed of rotation exceeds the predetermined threshold the valve returns to the open position to allow the fluid to return to the hydraulic seal.

Such a valve arrangement would simplify the geometric shape of the annular reservoir. Furthermore, this arrangement may be particularly useful in a bi-directional machine where it may rotate clockwise or anticlockwise.

Although the reservoir has been described as being annular, this does not necessarily imply that the reservoir is circular. The reservoir may form any continuous shape, such as an oval, rectangle, etc. Furthermore, although the annular reservoir 16 has been described as being located on the high pressure side of the hydraulic seal, this need not be the case. The annular reservoir may be located on either or both the high and low pressure sides of the hydraulic seal. That said it may be advantageous to position the annular reservoir on the opposite side of the hydraulic seal to the inlet port which supplies hydraulic fluid to the hydraulic seal. Moreover, the annular reservoir may be located on the inner shaft instead of the outer shaft. For example, the annular reservoir may be positioned on the annular fin.

Furthermore, although only one annular reservoir is shown with one hydraulic seal, depending on the application one or more annular reservoirs could provide hydraulic fluid to one or more hydraulic seals.

The dividing walls 32 need not be oriented in a radial direction as shown and described herein. For example, it may be advantageous to angle the dividing walls 32 to provide a funnel to channel the fluid from the transition region 26 into the central chamber 20.

The number of chambers within the annular reservoir may vary and be dependent on the requirements of the application. Furthermore, the number of openings to the annular reservoir may be altered and is dependent on the application. In addition, the inner and outer chambers are shown as being internal to the reservoir; however they may be internal or external to the main reservoir.

Although the annular reservoir has been described with reference to an intershaft hydraulic seal, it could be used in any application where a component or system may suffer from fluid starvation or a delay in fluid feed and thus it is desired to provide an immediate hydraulic fluid feed. For example, the annular reservoir may be used with: hydraulic traps, splines, bearings, gears, pumps, jets, etc.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention claimed is:

1. A hydraulic seal arrangement for a rotating machine, the hydraulic seal arrangement comprising:
    a hydraulic seal; and
    an annular reservoir fluidly coupled to the hydraulic seal; wherein the annular reservoir is arranged to retain fluid from the hydraulic seal when the machine is shutdown and to return the retained fluid to the hydraulic seal under centrifugal force after the machine is restarted;
        the reservoir comprises an inner chamber having an opening, an outer chamber having an opening and a central chamber in fluid communication with the inner and outer chambers;
        the inner, outer, and central chambers are separated by partitions;
        the partitions extend around only a portion of the circumference of the annular reservoir and terminate in a transition region where fluid may traverse between chambers; and
        the transition region is radially confined between a first partition wall and a second partition wall, includes a first circumferential end that is in direct fluid communication with all the chambers, and includes a second circumferential end that is in fluid communication only with the central chamber but separates the transition region from the inner chamber and the outer chamber.

2. A hydraulic seal arrangement as claimed in claim 1, wherein the annular reservoir comprises one or more openings which allow fluid to enter the reservoir during normal operation and to exit the reservoir after the machine is restarted.

3. A hydraulic seal arrangement as claimed in claim 2, wherein the annular reservoir comprises a valve which selectively closes the opening.

4. A hydraulic seal arrangement as claimed in claim 3, wherein the valve selectively closes the opening in response to the rotational speed of the machine.

5. A hydraulic seal arrangement as claimed in claim 1, wherein the reservoir is arranged such that under normal operation fluid enters the reservoir via the opening of the outer chamber and exits the reservoir via the opening of the inner chamber.

6. A hydraulic seal arrangement as claimed in claim 1, wherein the reservoir is arranged such that upon shutdown of the machine the inner and outer chambers of the reservoir are drained of fluid and the central chamber retains fluid.

7. A hydraulic seal arrangement as claimed in claim 6, wherein the retained fluid is returned to the hydraulic seal after the machine is restarted via the opening of the outer chamber.

8. A hydraulic seal arrangement as claimed in claim 1, wherein the outer chamber is positioned further radially outward than at least a portion of the central chamber and wherein the inner chamber is positioned further radially inward than at least a portion of the central chamber.

9. A hydraulic seal arrangement as claimed in claim 1, wherein one end of each of the inner and outer chambers is separated from the transition region by a respective dividing wall.

10. A hydraulic seal arrangement as claimed in claim 1, wherein the inner and outer chambers are spaced from one another in an axial direction.

11. A hydraulic seal arrangement as claimed in claim 1, wherein the opening of the outer chamber is oriented in a substantially axial direction and wherein the opening of the inner chamber is oriented in a substantially radial direction.

12. A gas turbine engine comprising a hydraulic seal arrangement as claimed in claim 1.

13. A hydraulic seal arrangement for a rotating machine, the hydraulic seal arrangement comprising:
    a hydraulic seal; and
    an annular reservoir fluidly coupled to the hydraulic seal;
    wherein the annular reservoir is arranged to retain fluid from the hydraulic seal when the machine is shutdown and to return the retained fluid to the hydraulic seal under centrifugal force after the machine is restarted,
    the reservoir comprises an inner chamber having an opening, an outer chamber having an opening and a central chamber in fluid communication with the inner and outer chambers,
    the reservoir is arranged such that under normal operation fluid enters the reservoir via the opening of the outer chamber and exits the reservoir via the opening of the inner chamber,
    the reservoir is arranged such that upon shutdown of the machine the inner and outer chambers of the reservoir are drained of fluid and the central chamber retains fluid,
    the retained fluid is returned to the hydraulic seal after the machine is restarted via the opening of the outer chamber, and
    the outer chamber is positioned further radially outward than at least a portion of the central chamber and wherein the inner chamber is positioned further radially inward than at least a portion of the central chamber.

* * * * *